United States Patent
Beaver et al.

(10) Patent No.: US 12,541,382 B2
(45) Date of Patent: Feb. 3, 2026

(54) USER PERSONA INJECTION FOR TASK-ORIENTED VIRTUAL ASSISTANTS

(71) Applicant: Verint Americas Inc., Alpharetta, GA (US)

(72) Inventors: Ian Beaver, Alpharetta, GA (US); Vladislav Luzin, Alpharetta, GA (US)

(73) Assignee: Verint Americas Inc., Alpharetta, GA (US)

( * ) Notice: Subject to any disclaimer, the term of this patent is extended or adjusted under 35 U.S.C. 154(b) by 377 days.

(21) Appl. No.: 17/815,685

(22) Filed: Jul. 28, 2022

(65) Prior Publication Data
US 2024/0036893 A1 Feb. 1, 2024

(51) Int. Cl.
G06F 40/40 (2020.01)
G06F 9/451 (2018.01)
G06Q 30/016 (2023.01)

(52) U.S. Cl.
CPC .............. G06F 9/453 (2018.02); G06F 40/40 (2020.01); G06Q 30/016 (2013.01)

(58) Field of Classification Search
CPC ........ G06F 9/453; G06F 40/40; G06Q 30/016
See application file for complete search history.

(56) References Cited

U.S. PATENT DOCUMENTS

| | | | |
|---|---|---|---|
| 10,714,086 B2 | 7/2020 | Kirazci et al. | |
| 2010/0145709 A1* | 6/2010 | Kumar | G10L 15/32 |
| | | | 704/E15.001 |
| 2014/0364082 A1* | 12/2014 | Baddeley | H04L 51/214 |
| | | | 455/406 |
| 2017/0017501 A1* | 1/2017 | Quast | G06F 3/048 |
| 2017/0359463 A1 | 12/2017 | Segalis et al. | |
| 2017/0359464 A1* | 12/2017 | Segalis | G06N 20/00 |
| 2019/0102379 A1* | 4/2019 | First | G06F 40/30 |
| 2019/0102700 A1* | 4/2019 | Babu | G06N 20/00 |
| 2019/0103101 A1* | 4/2019 | Danila | G10L 15/22 |
| 2019/0325081 A1* | 10/2019 | Liu | H04L 67/75 |
| 2021/0089588 A1* | 3/2021 | Le | G06N 3/04 |

(Continued)

OTHER PUBLICATIONS

Qian et al., CIKM '21, Nov. 1-4, 2021, Virtual Event, Australia, pp. 1467-1477, (Year: 2021).*

(Continued)

*Primary Examiner* — Richard W. Crandall
(74) *Attorney, Agent, or Firm* — Meunier Carlin & Curfman LLC

(57) ABSTRACT

An intelligent virtual assistant (IVA) is deployed to place a call/chat to customer service on behalf of the customer, thus saving them time and frustration. The IVA contacts a specific company over one or more channels, for example, chat, phone call, Application Programming Interface (API), or email, in order to complete open-ended task(s) requested by its user. Before the IVA contacts the company, a specific user profile is injected into an IVA dialog state. The IVA contacts the company or agency and answers customer service agent (CSA) questions by using the specific user profile provided for the call. The IVA then stores the task outcome for the user to review. If something prevents the task from succeeding, the IVA alerts the user that either it needs more information or the user may need to perform some action before the task can be completed, such as filling out or emailing a form.

20 Claims, 11 Drawing Sheets

(56) References Cited

U.S. PATENT DOCUMENTS

| | | | | |
|---|---|---|---|---|
| 2021/0090570 A1* | 3/2021 | Aharoni | ................ | G10L 15/32 |
| 2021/0233097 A1* | 7/2021 | Doumar | ........... | G06Q 10/06315 |
| 2021/0314282 A1* | 10/2021 | Sharma | ................ | G06F 3/167 |
| 2022/0051664 A1* | 2/2022 | Baror | ................ | G06F 3/0482 |

OTHER PUBLICATIONS

Hong et al, End to End Task-oriented dialog system through template slot value generation, Interspeech 2020, published 2020, available at: < https://www.isca-archive.org/interspeech_2020/hong20b_interspeech.html > (Year: 2020).*

Leviathan et al., Google Duplex: An AI System for Accomplishing Real-World Tasks Over the Phone, [online], published May 8, 2018, available at: < https://research.google/blog/google-duplex-an-ai-system-for-accomplishing-real-world-tasks-over-the-phone/ > (Year: 2018).*

\* cited by examiner

| Key | First Name | Last Name | Address | City | State | ZIP | Date of Birth | Home Phone | Mobile Phone | E-mail Address | Account Number |
|---|---|---|---|---|---|---|---|---|---|---|---|
| 1 | Thomas | Smith | 123 Anywhere Street | Anytown | GA | 33220 | 1/1/2000 | 555-555-5555 | 555-555-5556 | none0@none.com | 11AA22BB |
| 2 | Scott | Johnson | 345 Anywhere Street | Anytown | GA | 33220 | 2/1/2001 | 555-555-5557 | 555-555-5558 | none1@none.com | 22AA33BB |
| 3 | Michael | Williams | 567 Anywhere Street | Anytown | GA | 33220 | 3/1/2002 | 555-555-5559 | 555-555-5560 | none2@none.com | 44AA55BB |
| 4 | Jeffery | Brown | 890 Anywhere Street | Anytown | GA | 33220 | 1/2/2000 | 555-555-5560 | 555-555-5561 | none3@none.com | 66AA77BB |
| 5 | Ann Marie | Jones | 234 Anywhere Street | Anytown | GA | 33220 | 1/2/2001 | 555-555-5562 | 555-555-5563 | none4@none.com | 88AA99BB |

*FIG. 3A*

| Key | Company | Purchase Date | Item | Ship Date | Shipping Service |
|---|---|---|---|---|---|
| 1 | Amazon | 4/2/2022 | Mouse Pad | 4/2/2022 | FedEx |

*FIG. 3B*

| Key | Airline | Departure Date | Departure Time | Flight Number | Departure City | Destination City | New Departure Date | New Departure Time | Upgrade |
|---|---|---|---|---|---|---|---|---|---|
| 2 | Delta | 4/5/2022 | 10:00 | 1234 | Atlanta | New York | 4/7/2022 | 8:00 | |
| 3 | American | 4/8/2022 | 6:00 | 934 | Philadelphia | Miami | 4/6/2022 | 13:00 | |

*FIG. 3C*

USER PERSONA INJECTION FOR TASK-ORIENTED VIRTUAL ASSISTANTS

CROSS REFERENCE TO RELATED APPLICATIONS

This application incorporates by reference herein U.S. patent application Ser. No. 17/875,790, entitled TASK GATHERING FOR ASYNCHRONOUS TASK-ORIENTED VIRTUAL ASSISTANTS, filed on Jul. 28, 2022. This application also incorporates by reference herein U.S. patent application Ser. No. 17/875,810, entitled TASK ORIENTED ASYNCHRONOUS VIRTUAL ASSISTANT INTERFACE, filed on Jul. 28, 2022.

BACKGROUND

If a customer has a request or task to be performed by customer service, they must place a phone call to a customer service contact number or initiate a chat session themselves. This can be very time-consuming and frustrating to the customer if there are wait times, transfers to different departments, dropped calls, or other issues with the request or task. Further, automated systems may only support phone calls, while others are limited to specific tasks, so a customer may be unable to complete the task using automated methods.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure describes methods and systems for a virtual assistant service and associated infrastructure that is deployed to communicate with a customer service agent (CSA) of an organization or entity on behalf of the customer. This saves the customer time and other resources. Moreover, the virtual assistant service having been trained to interact with a customer service agent will be more efficient than a customer communicating directly. The virtual assistant service includes an outbound IVA service component that contacts the entity over one or more channels, for example, chat, phone call, Application Programming Interface (API), or email, in order to complete the open-ended task(s) or requests made by the customer. Before the outbound IVA service component contacts the entity, a specific user profile is injected into an IVA dialog state such that the IVA dialog state includes information about the customer. Once the outbound IVA service component contacts the entity, it answers customer service agent questions by using conversational models and data included in the specific user profile provided for the call. Upon completion, the outbound IVA service component stores the outcome to report to the customer and for the customer to review. If something prevents the task from succeeding, the outbound IVA service component alerts the customer that either it needs more information or that the customer may need to perform some action before the task can be completed, such as filling out or emailing a form.

In accordance with the present disclosure, a method of injecting a user persona into task-oriented virtual assistants is disclosed. The method may include receiving a request to perform a task at an outbound intelligent virtual assistant (IVA) service component; receiving a user profile from an application database to execute the task; selecting a channel over which to contact an entity associated with the task; loading a conversational model from a task model component in accordance with the selected channel; initiating a communication with the entity over the selected channel using the conversational model and the user profile; and communicating over the selected channel using the conversational model to perform the task by simulating a customer associated with user profile.

In accordance with the present disclosure, a computer system is described that includes a memory comprising computer-executable instructions; and a processor configured to execute the computer-executable instructions and cause the computer system to perform a method of injecting a user persona in task-oriented virtual assistants. The computer system may execute instructions to receive a request to perform a task at an outbound intelligent virtual assistant (IVA) service component; receive a user profile from an application database to execute the task; selecting a channel over which to contact an entity associated with task; load a conversational model from a task model component in accordance with the selected channel; initiate a communication with the entity over the selected channel using the conversational model and the user profile; and communicate over the selected channel using the conversational model to perform the task by simulating a customer associated with user profile.

In accordance with yet another aspect of the disclosure, there is described a non-transitory computer readable medium comprising instructions that, when executed by a processor of a processing system, cause the processing system to perform a method of injecting a user persona in task-oriented virtual assistants, comprising instructions to: receive a request to perform a task at an outbound intelligent virtual assistant (IVA) service component; receive a user profile from an application database to execute the task; select a channel over which to contact an entity associated with task; load a conversational model from a task model component in accordance with the selected channel; initiate a communication with the entity over the selected channel using the conversational model and the user profile; and communicate over the selected channel using the conversational model to perform the task by simulating a user associated with user profile.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 3A illustrates example customer information associated with a user profile according to certain embodiments.

FIG. 3B illustrates example dynamic information associated with a user profile according to certain embodiments.

FIG. 3C illustrates additional examples of dynamic information associated with a user profile according to certain embodiments.

DETAILED DESCRIPTION

Overview

Figure 1A:
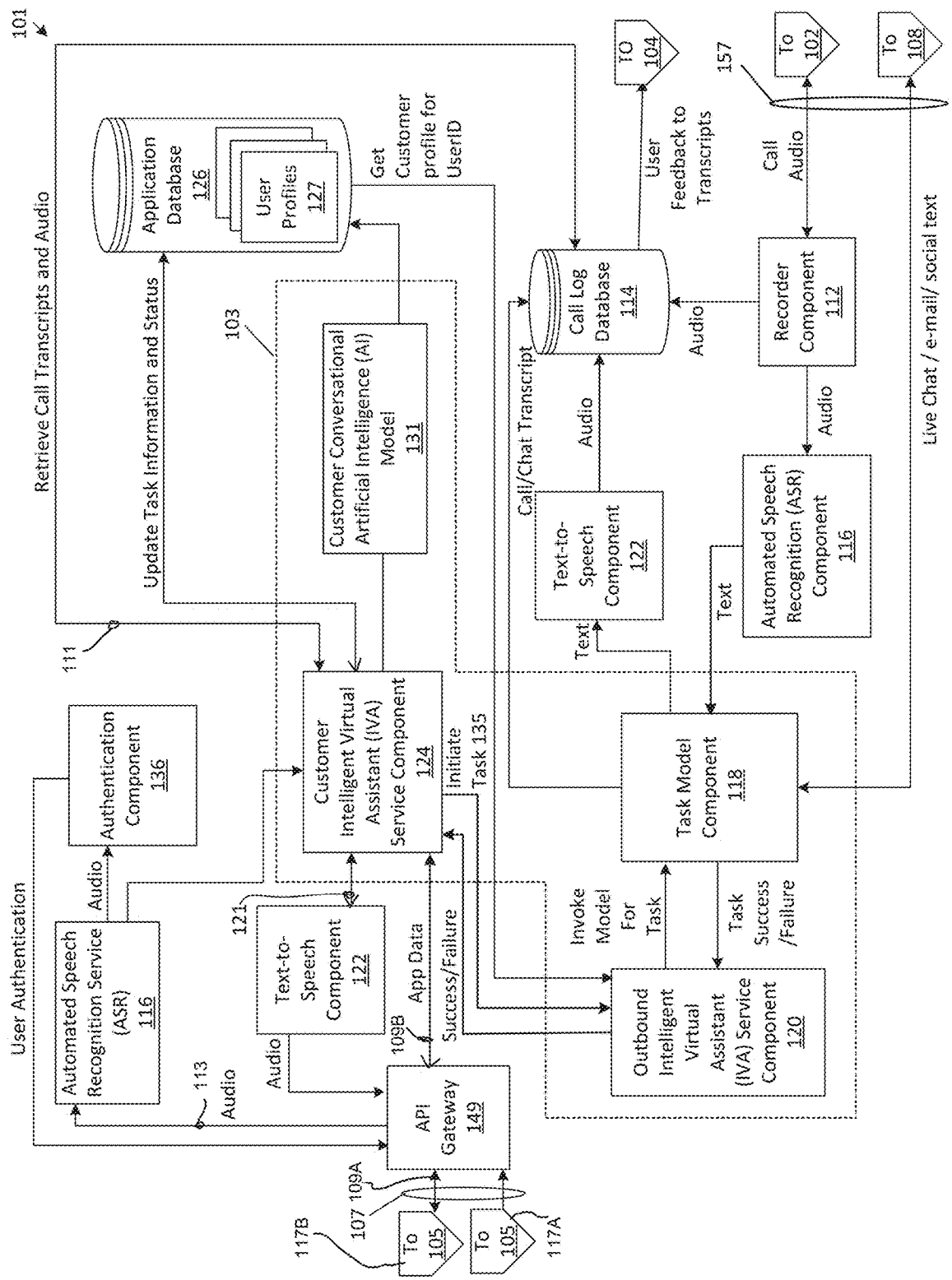
FIG. 1A illustrates the backend hardware used for the intelligent virtual assistant (IVA) to fulfill requested tasks.

The present disclosure is directed to a virtual assistant service and associated infrastructure that is deployed to place a call or chat to an entity on behalf of a customer. The "entity" may include, but is not limited to, a contact center, a business, a service provider, a government agency, a healthcare provider, a financial services organization, a person or other organization or individual. The overall virtual assistant service includes a customer-facing intelligent virtual assistant service component, referred to herein as the "customer IVA service component" and an outbound intelligent virtual assistant service component, or "outbound IVA service component" that has been previously trained to interact with the entity. The virtual assistant service optionally achieves asynchronous operation on a first communications link, directing task request data to the customer IVA service component, and a separate communications link directing communications from the outbound IVA service component to the entity fulfilling the task.

The outbound IVA service component may use one or more channels, for example and without limitation, chat, phone call, voice, text, Application Programming Interface (API), or email, in order to complete open-ended task(s) or requests made by the customer. An open-ended task includes, but is not limited to, any task that can be fulfilled by a third party entity in a bi-directional communication with a virtual assistant and/or a customer who provides information to the virtual assistant. Without limiting this disclosure, open ended tasks associated with this disclosure may often be completed via digital communications and software instructions that are ultimately implemented by computers. As discussed below, the outbound IVA service component may be configured to retrieve and compile task-oriented information that an entity can use to complete a task. Aspects of this disclosure assess whether the IVA has been previously trained on how to perform a requested task and what information is needed to perform that task. If the IVA has not yet been trained on the requested task, then the task can be added to a priority queue for future tasks that need to be trained. The priority for training a certain task can be increased in the priority queue if the training protocol for the task already exists but has not been completed. The customer, who makes a request or desires a task to be completed that requires communication with the fulfilling entity, can direct the outbound IVA service component to contact the entity through a variety of methods such as text, speech, or user interface (UI) controls. In order for the outbound IVA service component to perform such tasks, the overall virtual assistant service creates and maintains respective user profiles for individual customers in a database. The task oriented information that the fulfilling entity needs can be obtained by a customer intelligent virtual assistant (IVA) service component requesting the information using, for example, a form in an application user interface or directly asking for specific information from the customer via a user interface, a conversational interface, for example, via voice or text/symbolic chat). With the user profile information and task information, the outbound IVA service component may inject information about a customer into conversational models in order to formulate channel-appropriate requests to the entity's customer service agent (CSA) in order to execute the request or task made by the user.

For example, a specific user profile is injected into an IVA dialog state such that the IVA dialog state includes information about the customer. In particular, the outbound IVA service component includes a response template like "My address is <address>" that is associated to a particular question. When a customer service agent asks a question, such as, "What is your current billing address?" the outbound IVA service component recognizes the intent of the question as "billing address," and then selects the response template associated to that intent, which would be "My address is <address>." The outbound IVA service component then uses the current user profile data to replace all occurrences of known variables in the user profile with the values. For example, if the user profile contained a variable "address"="123 N Stevens Ave, Spokane WA 99201", the virtual assistant service would inject or replace all occurrences of "address" in the template with that value to create a response of "My address is 123 N Stevens Ave, Spokane WA 99201", which would be sent to a text-to-speech service to be communicated to the customer service agent associated with the entity.

The outbound IVA service component answers the customer service agent questions by using the conversational models and the user profile provided for the call. Upon completion, the outbound IVA service component stores the outcome for the customer to review. If something prevents the task from succeeding, the outbound IVA service component alerts the customer that either it needs more information or that the customer may need to perform some action before the task can be completed, such as filling out or emailing a form.

Example Environment and Processes

Figure 1B:
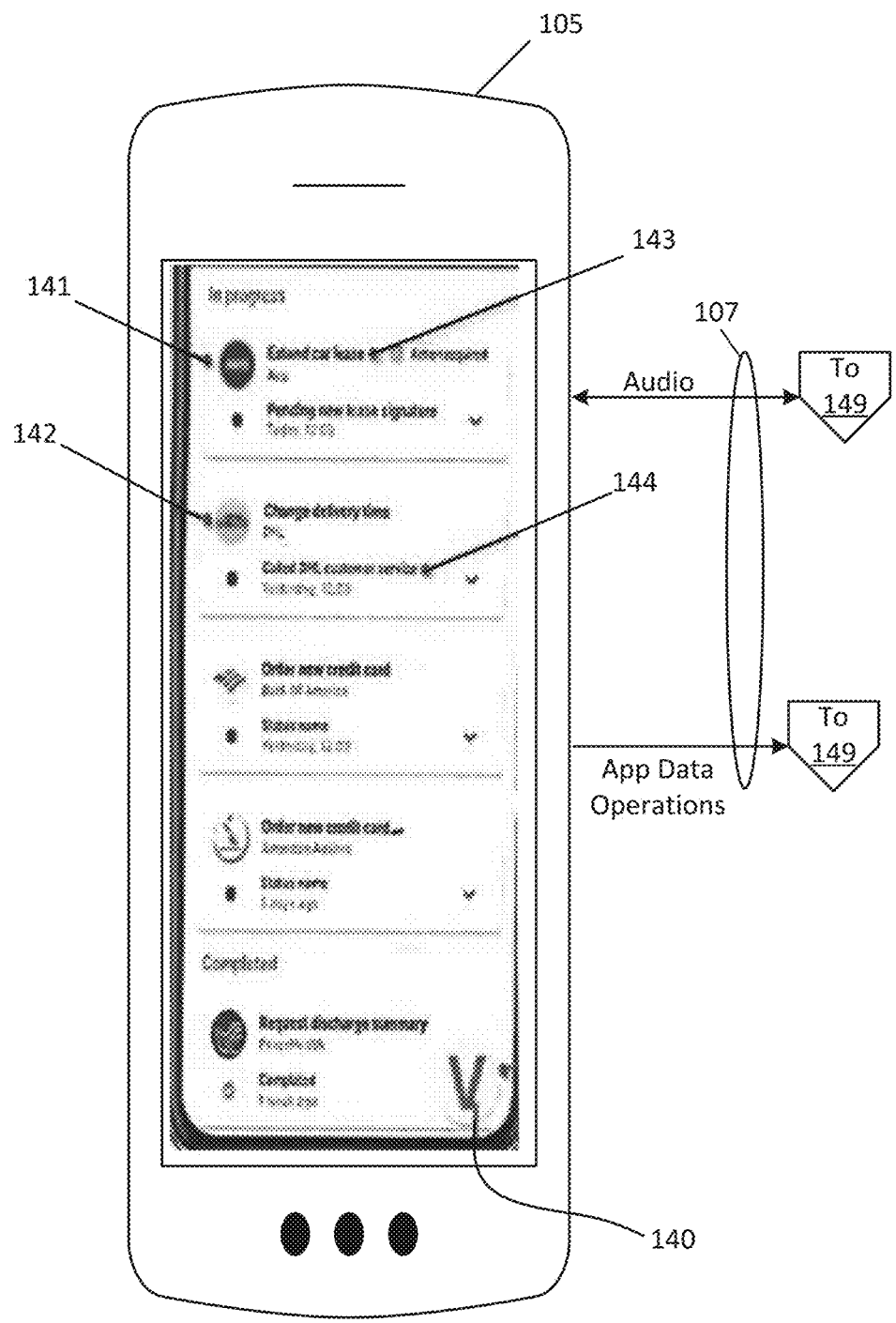
FIG. 1B is a schematic illustration of a customer device having an IVA application installed thereon.
Figure 1C:
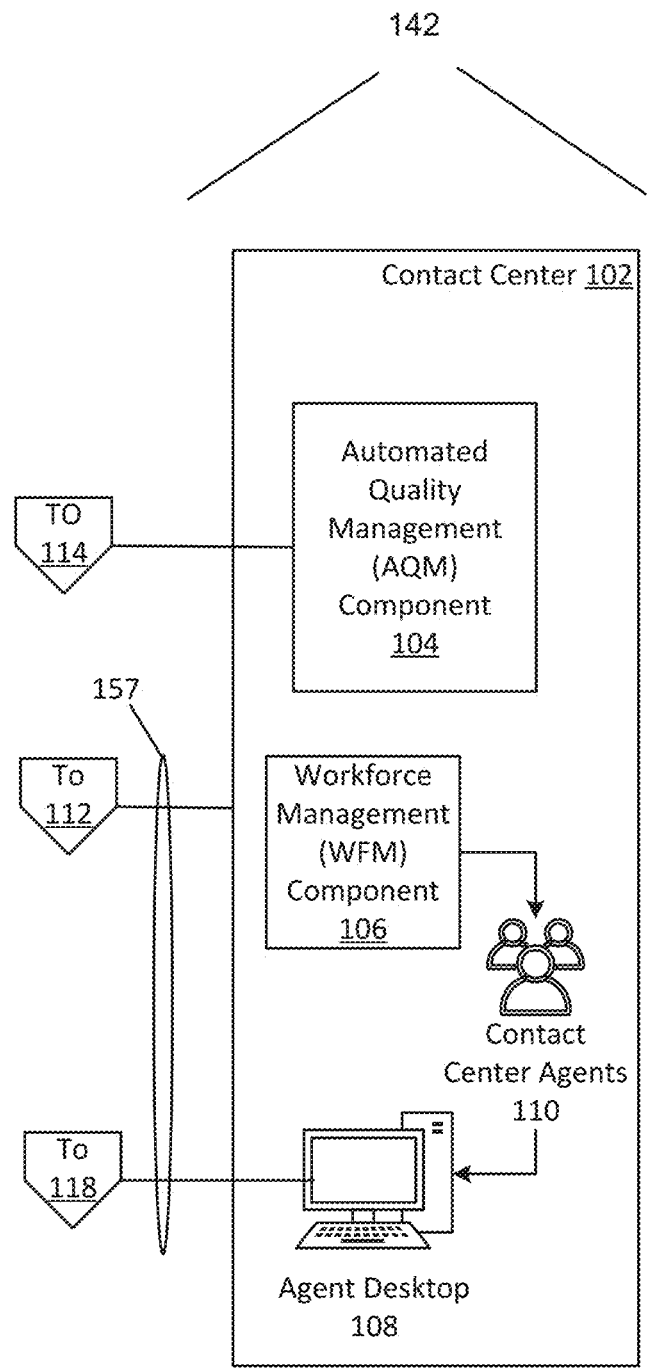
FIG. 1C illustrates one example of a destination entity that is equipped to fulfill a task via communications with the IVA of FIG. 1A.

FIGS. 1A-1C illustrate an overview schematic of a system 101 that implements asynchronous task fulfillment for a plurality of requested tasks 143 by utilizing an intelligent virtual assistant (IVA) application 140 operated on a computerized customer device 105 (FIG. 1B). The system 101 includes a first communications link 107 between the customer device 105 and a virtual assistant service 103 that includes a task model component 118, an outbound virtual assistant (IVA) service component 120, a customer intelligent virtual assistant (IVA) service component 124 and at least one customer conversational artificial intelligence (AI) model 131. The first communications link 107 is distinct from an outbound route over a separate communications link 157 between the virtual assistant service 103 and a destination entity 142, including but not limited to a contact center 102 (FIG. 1C). The destination entity 142 can be any other party communicating with the virtual assistant service 103 and having the resources to fulfill the task 143 at hand. The distinct communications channels 107, 157 allow the IVA application 140 on the customer device 105 to run the task fulfillment operations in the background while the customer device is actively engaged in other software driven activities operating on the customer device 105. As shown in FIG. 1A, multiple tasks may utilize the first communications link 107 to transmit task request data to the virtual assistant service 103. Each of the tasks may have different outbound routes over the separate communications link 157 communicating with a respective destination entity 142 that is appropriate for the task at hand.

Non-limiting embodiments of the virtual assistant service 103 may be described relative to software components and associated computer hardware that implement the two distinct communications channels for efficient task fulfillment via a virtual assistant service 103. The first communications link 107 is configured to direct task request data 117A to a customer IVA service component 124. The customer IVA service component 124 may include software programs implemented in computer hardware to prepare the task request data for use in the separate communications channel 157. After preparing the task request data 117A received on the first communications link 107, the system 101 incorporates the separate communications channel 157 connecting the virtual assistant service 103 to the destination entity 142 that fulfills the task.

FIG. 1A includes telecommunications hardware and computerized services that allow for state-of-the-art handling of the task request data 117A before it arrives at the customer IVA service component 124. For example, and without limiting this disclosure to any one embodiment, system 101 includes an application programming interface (API) gateway 149 that directs communications from the customer device 105 to the customer IVA service component 124. The API gateway 149 may also direct communications from the customer device 105 to an authentication component 136 that utilizes a biometric identification and verification service to ensure system security. The authentication component 136 of FIG. 1 is shown as utilizing an automated speech recognition component (ASR) 116 to implement a voice activated authentication process, such as voice biometrics. Of course, other authentication services may be used in conjunction with the system 101 of FIGS. 1A-1C. In some non-limiting embodiments, the ASR 116 may also include speech to text software to send communications from the customer device 105 as task request data 117A in text format to the customer IVA service component 124. In an alternative embodiment, also shown in FIG. 1A, the ASR 116 may utilize a separate text to speech component 122 that services the overall intelligent virtual assistant 103 to ensure that task request data 117A/121 arrives at the customer IVA service component 124 in a proper format. The system 101 is configured with the customer IVA service component 124 receiving task request data 117A from a customer device 105. The customer IVA service component 124, in turn, is in data communication with at least one, and possibly several, customer conversation artificial intelligence (AI) components 131 to complete specialized language processing steps, including but not limited to, natural language processing (NLP), language parsing, language tokenization, context and concept classification, data labeling, and intent recognition from the task request data 117A. The customer IVA service component 124 receives requests from the customer device 105 associated with the customer and sends task requests to the outbound IVA service component 120 and receives task success/failure information from the outbound IVA service component 120 after a task executed. A response 109A to the communication 117B may be transmitted over the first communications link 107 from the IVA application 140 to the virtual assistant service 103. Updates 109B may be received at the IVA application regarding progress of the task request underway on the virtual assistant service 103.

User profiles 127 are stored in an application database 126 in a data structure. Each customer's user profile 127 is a data record where user information is stored. A typical user profile contains a first class of information that is static or relatively unchanging information, such as a user's first name, last name, username, mailing address, and email address. In accordance with the present disclosure, each customer's user profile 127 contains a second class of information that is dynamic task-oriented information, such as package tracking number, repair date, delivery address, product name, purchase date, airline information, etc. FIGS. 3A, 3B and 3C illustrate examples of both classes of information that is contained in the user profile 127. The customer's user profile is injected into the conversational models in order to formulate channel-appropriate requests to the contact center 102 in order to execute the request or task made by the customer. For example, a script may be prepared from the conversational models having delexicalized variable names and the delexicalized variable names are mapped to respective names of the data within the user profile 127.

These specialized procedures are further enabled by the virtual assistant service 103 maintaining communications with the application database 126 that may be operated in local servers, remote computers, or cloud-based computing devices.

The system 101 is adapted to use the above-described components with incoming task request data 117A and provide more content rich task instructions 135 for use in the separate communications link 157, linking the virtual assistant service 103 to the task fulfilling destination entity 142. The task instructions 135 may include an identification of the destination entity 142 that will fulfill the task, the intent or object of the task instructions, and a selected communications channel for the virtual assistant service 103 to engage in bi-directional communications with the destination entity 142.

In regard to providing the task request data 117A to the virtual assistant service 103, this disclosure encompasses a system 101 for task fulfillment by the virtual assistant service. The system includes a customer intelligent virtual assistant (IVA) service component (the customer IVA service component 124) that operates on a computer or multiple connected computers to implement the virtual assistant service. A first communications link 107 is configured to transmit task request data 117A to the customer IVA service component 124. A customer conversational artificial intelligence component 131 is trained to utilize a processor in communication with the computer(s) to extract a destination identifier 414 from the task request data 117A. The conversational artificial intelligence component 131 may include numerous models and algorithms, at least one of which is trained to classify an intent 430 of the task request data; other models may also be trained to select a communications channel 422 for communicating with a destination entity 142 to fulfill the intent of the task request data 117A. The computer forms task instructions 135 that may include the destination identifier, the intent of the task request data, and a selected communications channel. The customer IVA service component 124 sends the task instructions 135 and associated data to an outbound IVA service component 120 configured for receiving the task instructions 135 from the customer conversational artificial intelligence component 120. In some embodiments, a separate communications link 157 is connected between the outbound IVA service component 120 and the destination entity 142 wherein the separate communications link 157 operates without directly accessing the first communications link 107. This disclosure shows how a virtual assistant service 103 may provide a user device with asynchronous access to multiple instances of task, as shown in FIGS. 2A-2D, by separating the communications occurring in real time with the customer facing portion of the virtual assistant service 103 (i.e., the customer IVA service component 124) and the destination facing portion of the virtual assistant service 103 (such as, the output IVA service component 120). The system 101, therefore, may include designated communications links for input and output sections of the virtual assistant service 103. The first communications link 107 transmits data between a customer device 105 and the virtual assistant service 103, and a separate communications link transmits other data between the virtual assistant service 103 and a destination entity 142. The first communications link and the second communications link are connected via the hardware and software of the virtual assistant service 103 as shown in FIGS. 1A-1C.

In one non-limiting embodiment, this disclosure describes a computer program product that implements an intelligent virtual assistant service 103. The computer program product may include numerous software components and hardware components that are installed and operated on at least one computer and possibly operate on a plurality of computers connected in data communication over a network. The computer program product may include, but is not limited to, a non-transitory computer readable medium storing software thereon that causes a processor in communication with computerized memory to perform procedures configured to receive, into the computerized memory, task request data 117A at a customer intelligent virtual assistant (IVA) service component 124 of the virtual assistant service 103. The software further accommodates operations that extract a destination identifier 414 from the task request data 117A, classify an intent 430 of the task request data 117A, select a communications channel for communicating with a destination entity 142 to fulfill the intent of the task request data, and initiate task instructions 135. In non-limiting embodiments, the task instructions 135 include the destination identifier, the intent of the task request data, and a selected communications channel. The customer intelligent virtual assistant (IVA service component 124 sends the task instructions 135 to an outbound IVA service component 120 of the virtual assistant service 103.

FIG. 1A illustrates one non-limiting example of components that may be encompassed with the virtual assistant service 103, while other components of the system 101 are illustrated separately, but in communication with the virtual assistant service 103. Without limiting this disclosure in any way, the virtual assistant service 103 is shown in FIG. 1A as including at least a customer IVA service component 124, a customer conversational artificial intelligence component 131, an outbound IVA service component 120, and a task models artificial intelligence component 118 (the task model component 118).

The outbound IVA service component 120 receives the task instructions 135 from the customer IVA service component 124. Similar to the above specialized language processing steps, the outbound IVA service component 120 is in data communication with at least one task model component 118 that includes a library of available pre-trained conversational models that can be organized by particular task, company, or industry. The task model component 118 takes advantage of numerous communication processing tools (i.e., text to speech components 122, automated speech recognition components 116, recording devices 112, and call log databases 114) to implement the task instructions 135 with a destination entity 142 on numerous available communications channels (i.e., chat, text, voice, or video).

In the system 101, the recorder component 112 may capture call audio with phone calls conducted between customers and the contact center agents 110. In some implementations, screen activity associated with the agent desktop 108 may be captured. The audio (and screen activity) may be recorded and stored in a call log database 114 so that it can be evaluated according to business needs. An automated speech recognition (ASR) component 116 may receive recorded audio from the recorder component 112. The ASR component 116 may utilize techniques such as acoustic models to translate received audio soundwaves into phonemes and language and pronunciation models to form words from the phonemes. The ASR component 116 creates transcripts of calls between the customers and contact center support agents 110 that are input to the task model component 118. In some embodiments, the recorder component 112 is configured to record all kinds of communications data, whether audio, text, voice, video, email, chat, or the like.

The task model component 118 accesses a library of available pre-trained customer conversational Artificial intelligence (AI) models 131 that can be organized by specific task, company, or industry. For example, there could exist an airline company that has specific terminology or business properties that differentiate it enough from other airline companies that a custom model is required for performance reasons. Furthermore, there may exist some complex task that requires a custom model to be created to enable a successful outcome for the task. A pre-trained conversational AI model is loaded into a dedicated process for each conversation so that it can converse with a customer service agent on any particular topic the model was trained for. Additionally or alternatively, the task model component 118 may include Machine Learning (ML) models.

The task model component 118 may include a neural network or statistical classifier that takes in the utterance from a customer service agent 110 and either predicts the appropriate response from a database of existing responses or it can be made to generate text directly to be passed to the Text-to-Speech component 122 to respond with. For example, if a customer service agent were to ask the IVA 103 the purpose of calling, the model it has loaded may be trained to respond with "I would like to purchase a ticket on behalf of customer <account ID>." The value for the variable <account ID> in the generated response can then be inserted from the user profile 127. This rendered text would then be passed to the Text-to-Speech component 122 to generate an audio form of the text to be played over the telephone network.

Such customer conversational models 131 for the IVA 103 can be created through various means. Typically, they involve labeling conversation data between humans with each participant's intention or purpose of an utterance; the dialog state up to the current point in a conversation and any actions that need to be performed at each turn in the conversation. This labeled data can then be used to train a model that, given a conversation history up to a point, will then predict the current customer intention, dialog state, and action to be taken. This conversation training data is typically delexicalized to remove company and participant-specific terminology. For example, the utterance "I would like to fly to Dallas on February second," could be delexicalized as "<actor> would like to fly to <destination_city> on <departure_date>," which allows the model to learn task structures without encoding dynamic information.

The outbound IVA service component 120 loads the appropriate conversational model for the channel from the task model component 118 to service a customer request. The outbound IVA service component 120 may be implemented with a single end-to-end model that learns the intentions, state, and action concurrently, or it could be implemented with individual models for intent classification, dialog state tracking, and action determination. The outbound IVA service component 120 may be trained on large volumes of log files from the channel being learned, such as call transcriptions, live chat transcripts, or email threads. The outbound IVA service component 120 is trained to follow the conversational behaviors of the customers in these logs as they navigate the task to completion with contact center agents. Once trained, the outbound IVA service component 120 is able to act on behalf of a customer using the same channel of the training data, but the responses will be generated in a delexicalized format.

FIGS. 1A and 1C illustrate that the above noted separate communications link 157 is used for ultimately fulfilling a task with the destination entity 142, which is shown as the contact center 102 in the non-limiting example of FIG. 1C. In one non-limiting example, the system uses the virtual assistant service 103 for communicating back and forth with the contact center customer service agent 110 until the task is successfully completed, failed, or a determination is made that there is a need for more data from the customer device 105. As shown in FIGS. 1A and 1C, communications between a virtual assistant service 103 and contact center 102 often allow for using numerous channels of communications in voice, text, and video domains. These channels are also subject to quality control, training, and internal process management via the shown Workforce management component 106 or automatic quality management (AQM) component 104.

The contact center 102 may be associated with an entity that is the recipient of a customer request or task and may manage interactions between a customer and the contact center agents 110. The contact center 102 may utilize omnichannel communications to connect customers with the contact center agents 110, who are customer service or sales professionals who handle interactions with a customer by phone, email, live chat, social media, Short Message Service (SMS) messaging, and support tickets. A transaction history of the customer interactions over the various channels is maintained by the contact center 102. For example, if a customer initiates a chat session, the information from the chat session is available to the contact center agents 110 should the customer decide to ask to speak with one of the contact center agents 110 while chatting.

The AQM component 104 automatically screens calls between customers and contact center agents 110 to determine if any of the interactions are non-compliant. For example, the interactions between the customers and contact center agents 110 may be measured against a set of rules such that the interactions are scored against a set of standards. Contact center agents 110 that are found not to be in compliance with standards may be provided coaching to improve their compliance.

The workforce management (WFM) component 106 is used in forecasting and scheduling of contact center agents 110 in the contact center 102. With an understanding of the skill sets and preferences of the contact center agents 110, the WFM component 106 aligns the contact center agents' skills with forecasted needs to derive staffing schedules within the contact center 102. The WFM component 106 may also provide options for the contact center agents 110 to request time off, shift swaps, and task switching.

The agent desktop 108 is a computing device running one or more applications that provide unified access to the applications and information used by the contact center agents 110 handling interactions with customers. The agent desktop 108 may be implemented using a variety of computing devices such as smartphones, desktop computers, laptop computers, and tablet-based computing devices. Other types of computing devices may be supported.

The separate communications link 157 used to fulfill respective task instructions 135 is bi-directional with numerous other computerized components to send status data, additional data requests, or other useful information back to the customer device 105 via the customer IVA service component 124. In this way, the IVA application 140 on the customer device 105 can be made aware, via the first communications link 107, of at least one requested task 143 being processed asynchronously with the virtual assistant service 103. The customer device 105 also receives an indication of the destination entity 142 receiving the task instructions and working with the virtual assistant service 103 to complete the requested task 143. Accordingly, the customer device 105 can track task state 144 for any given requested task. When more than one requested task is operating in the background of an active customer device 105, the IVA application 140 on the customer device 105 has software to arrange the different tasks on a graphical user interface in simulated cards 141 for each respective task underway. The IVA application 140 may be in communication with the above noted application database 126 to maintain management of the task name 143, the task state 144, and the destination entity 142 fulfilling the task. The simulated cards 141 shown on the customer device 105 may be configured to have an alert indicator if a requested tasks needs attention by the customer using the customer device.

Referring again to FIG. 1B, on a main page of the IVA application, the customer may see a list of tasks that are currently running in the backend system on the customer's behalf. For each task, the list on a graphical user interface may include task name 143, current state of the task 144, and a third party or destination entity 142 involved in completing the task. The customer may also see or be provided with the ability to display a list of tasks that have been completed by the IVA application. If there is input or action needed to be performed by the customer, a card may have an alert indicated on it, as well as a potential notification in the mobile device or browser. If the customer would like to input a new task the customer can launch the virtual assistant using a launch button 140 and state the task over voice or text. Upon receipt of an input for a new task, the new task is provided to the virtual agent via the virtual assistant service 103 to be sent to the contact center 102.

Figure 2A:
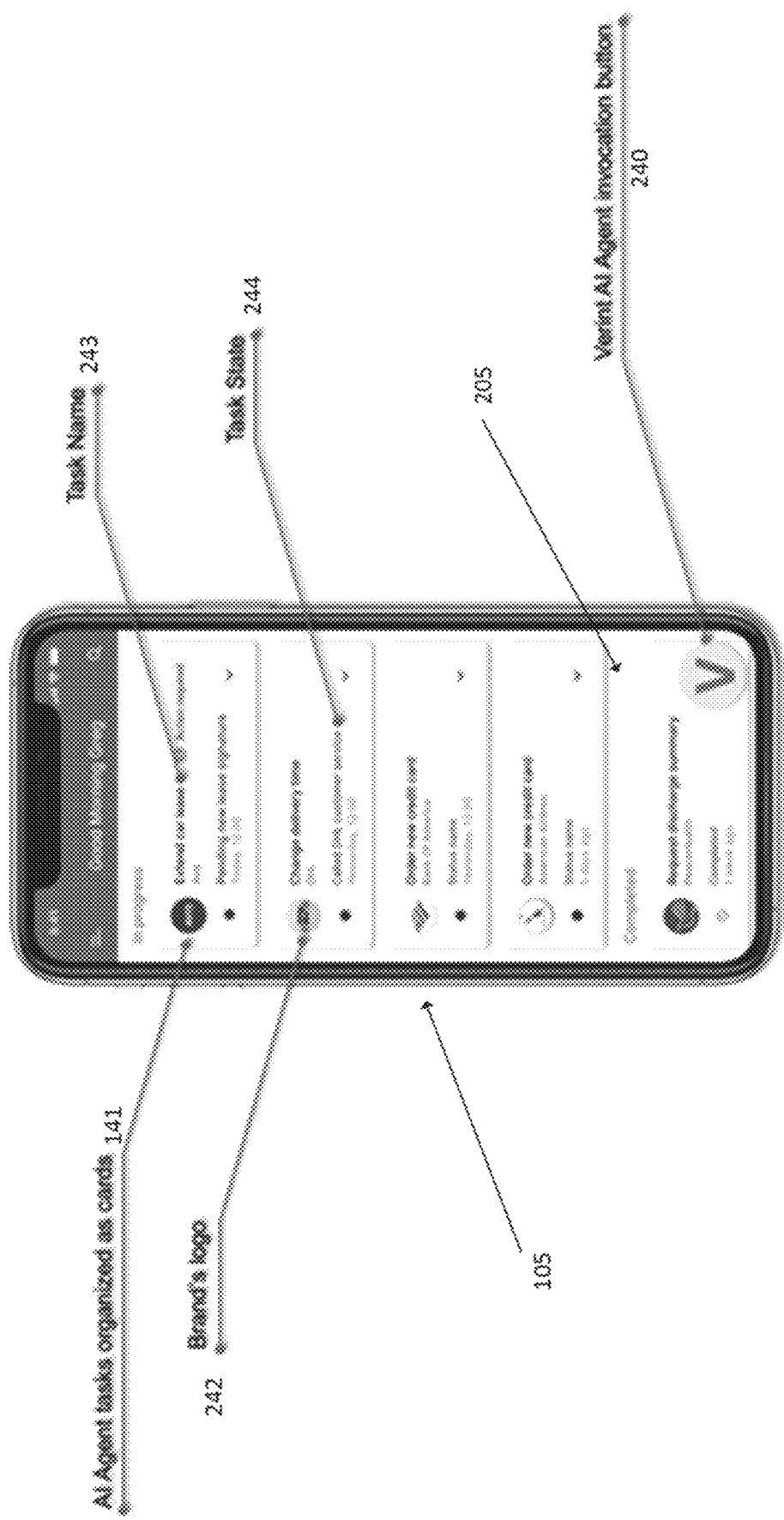
FIG. 2A illustrates simulated cards displayed on the graphical user interface of the customer device of FIG. 1B and used to track multiple tasks underway via the IVA of FIG. 1A.

Referring to FIG. 2A, to facilitate operation of an IVA 103 on behalf of the customer, the customer may interact and initiate IVA tasks via an application 143 running on a graphical user interface (GUI) 205 on a customer device 105, such as a smartphone, desktop computer, laptop computer, tablet, or the like. The device 105 may or may not include audio communication capability, e.g., to allow the customer to engage the system via an audio interaction such as call audio on the separate communications link 157, as illustrated in FIG. 1A. The customer device 105 may or may not include audio communication capability, e.g., to allow the customer to engage the system via an audio interaction such as a call audio communication channel 113, as illustrated in FIG. 1A.

As illustrated in FIG. 2A, artificial intelligence tasks on behalf of the customer are displayed and organized as simulated cards 141 corresponding to one or more tasks on behalf of the customer. Each of the simulated cards 141 provides information to the customer for tasks running in parallel with one another. For example, in the illustrated embodiment, a card may include the brand logo 242 of a destination entity 142 that is the object of a task running on behalf of the customer, a task name or other identifying information 243, and a task status or other information 244. The graphical user interface 205 may further include a launch button 240, which invokes the artificial intelligent virtual agent running in the background (e.g., via a network illustrated in FIGS. 1A and 1C) on behalf of the customer.

That is, the graphical user interface 205 is a "front-end" input portal that allows the customer to activate or invoke the IVA to act on the customers behalf according to principles described herein. Using the graphical user interface 205, the customer has the ability to launch new tasks, end tasks and to view and interact with any of the asynchronous tasks currently running on the customers behalf, as displayed via simulated card 141 in the graphical user interface 205. The simulated cards 141 may be displayed in any order, including, for example, in a task timeline order, alphabetical or custom order, as provided by the customer. In some embodiments, the simulated card 141 may display a transcript 111 of interactions on behalf of the customer as part of the task request. The application may also allow the customer to view past tasks and information related to those past tasks, including the resolution of the task.

Referring again to FIG. 1A, the system 101 includes a database that contains a set of tasks that have been created, e.g., task model component 118. For example, a database repository may include a library specific tasks available to the customer, and may be organized by topic, task, company or industry, or the like. The IVA application 140 running on the customer device 105 may be implemented using any dialog system framework or toolkit.

Once the customer has actuated the IVA application 140 with the actuating button 240 and stated a request over speech or text, the IVA application 140 activates the customer IVA service component 124 via the graphical user interface 205. The task request data 117A is sent to the backend virtual assistant service 103, which can be implemented using any number of dialog management toolkits or methods. The virtual agent 140 may make use of the customer conversational artificial intelligence (AI) model 131 to recognize the input from the user and identify the task.

As illustrated in FIG. 1A, communication between the customer device 105 and the IVA 103 may be made via first communication link 107 to an API gateway 149. The API gateway 149 may pass the request directly to a customer intelligent virtual assistant service component 124 or may pass the request to an authentication component 136 for authentication of the customer. An automated speech recognition service (ASR) 116 may be implemented for authentication of the customer (by passing an audio portion of the communication from the customer to the authentication component 136, using e.g., voice biometrics). After authentication and transmission of the task request data 117A, the request may be provided to the customer IVA service component 124. Within the system, the customer IVA service component 124 accesses an application database 126 for providing user profiles, accessing task information and status updates, and confirming customer information and any other appropriate information. The application database 126 is configured to communicate to and from the API 149 and graphical user interface 205 running on the customer device 105.

Figure 2B:
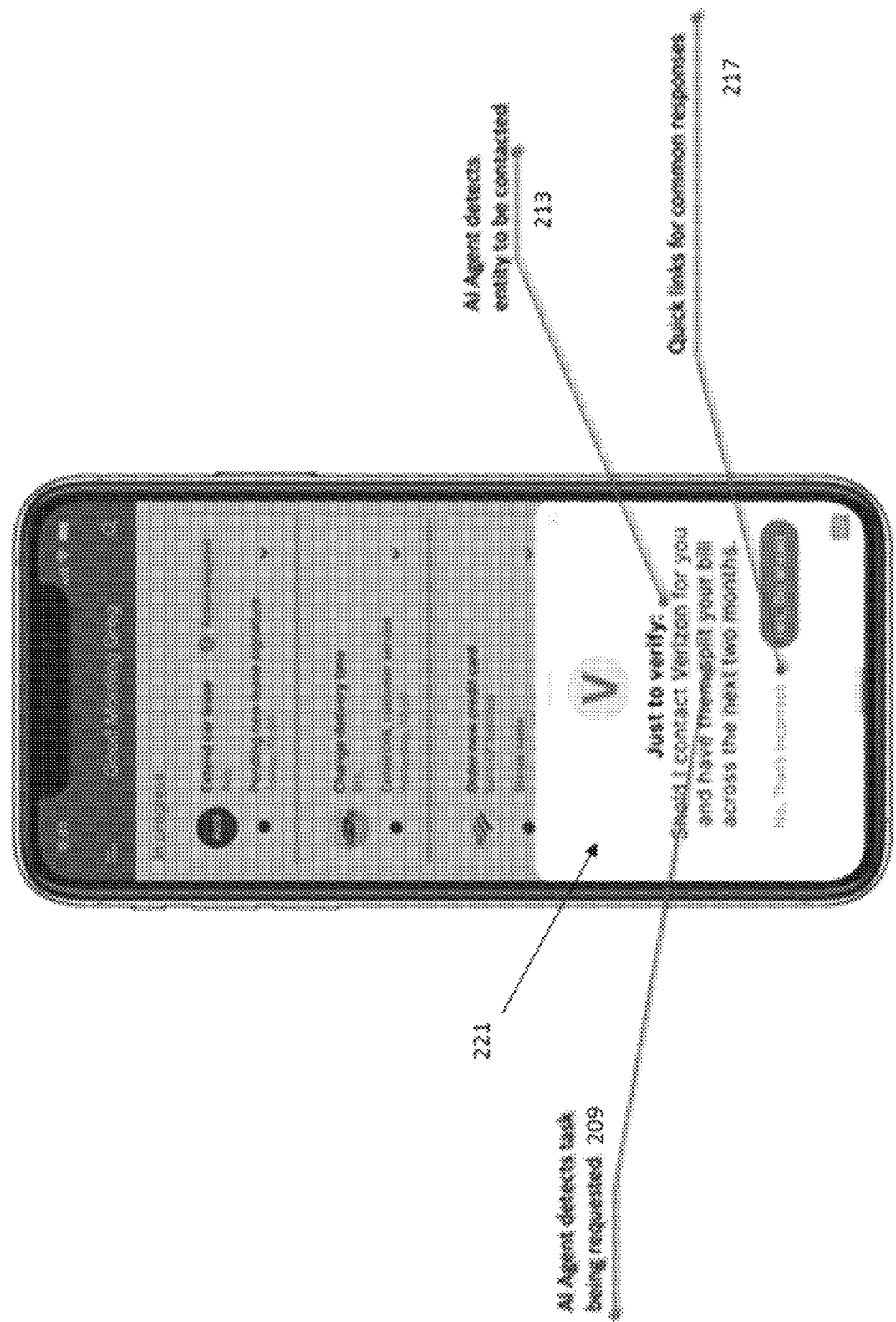
FIG. 2B is a schematic illustration of functions available in a user interface of the customer device running an IVA application of FIG. 1B.

Once the task request data 117A is received from the customer, the virtual agent application 140, running via the graphical user interface 205 or a different audio component (not shown) on the customer device 105, may provide information related to the task to the customer IVA service component 124. In some embodiments, the IVA application 140 is configured to receive a notifier back from the virtual assistant service 103 that the customer IVA service component 124 has interpreted the task request data 117A in a certain way and request confirmation that the task requested was properly understood by the customer IVA service component 124. For example, as illustrated in FIG. 2B, the GUI 205 may display text defining the task 209 and may, for example, highlight pertinent information such as the entity to be contacted 213 such as a business or agency and/or the primary task it is being asked to be performed on the customer's behalf with the customer IVA service component 124. The GUI 205 may also display quick links for common responses 217, e.g., to confirm that the task displayed is the task requested.

Although shown here as a request for confirmation of a task requested by the customer, the display window 221 may display other information or request other information of the customer, such as identifying additional information needed to prepare the task requested or requesting customer profile data, or the like. Although not shown, the GUI 205 may provide text or speech input mechanisms for receiving additional information from the customer or may provide common quick responses, as illustrated with respect to the confirmation of the task requested (as shown in FIG. 2B).

Upon confirmation or correction of the task by the customer, the customer IVA service component 124 may begin the requested task, and the graphical user interface will display a new task card 143 to show the state of the new task being performed on behalf of the customer as a result of the request. If additional information is needed to perform the task, such as a package tracking number or customer profile information, it will be requested from the user at this time. Once the task is confirmed and information is collected, the customer intelligent virtual assistant (IVA) service component 124 will initiate task instructions 135, and the task will be added to the task model component 118, among other tasks, via the outbound intelligent virtual assistant (IVA)

service component 120. Before finalizing the task instructions 135, the customer IVA service component 124 initiates a new background AI agent process with the customer conversation artificial intelligence (AI) components 131 in communication with the customer intelligent virtual assistant (IVA) service component 124. This background AI agent process will be created to ensure that content rich instruction data 135 is structured to allow the outbound IVA component 120 proceed to perform the task and update the application database 126 with the task progress. A new task card 143 will appear in the GUI 205 to show the state of the new background task to the user.

Figure 2C:
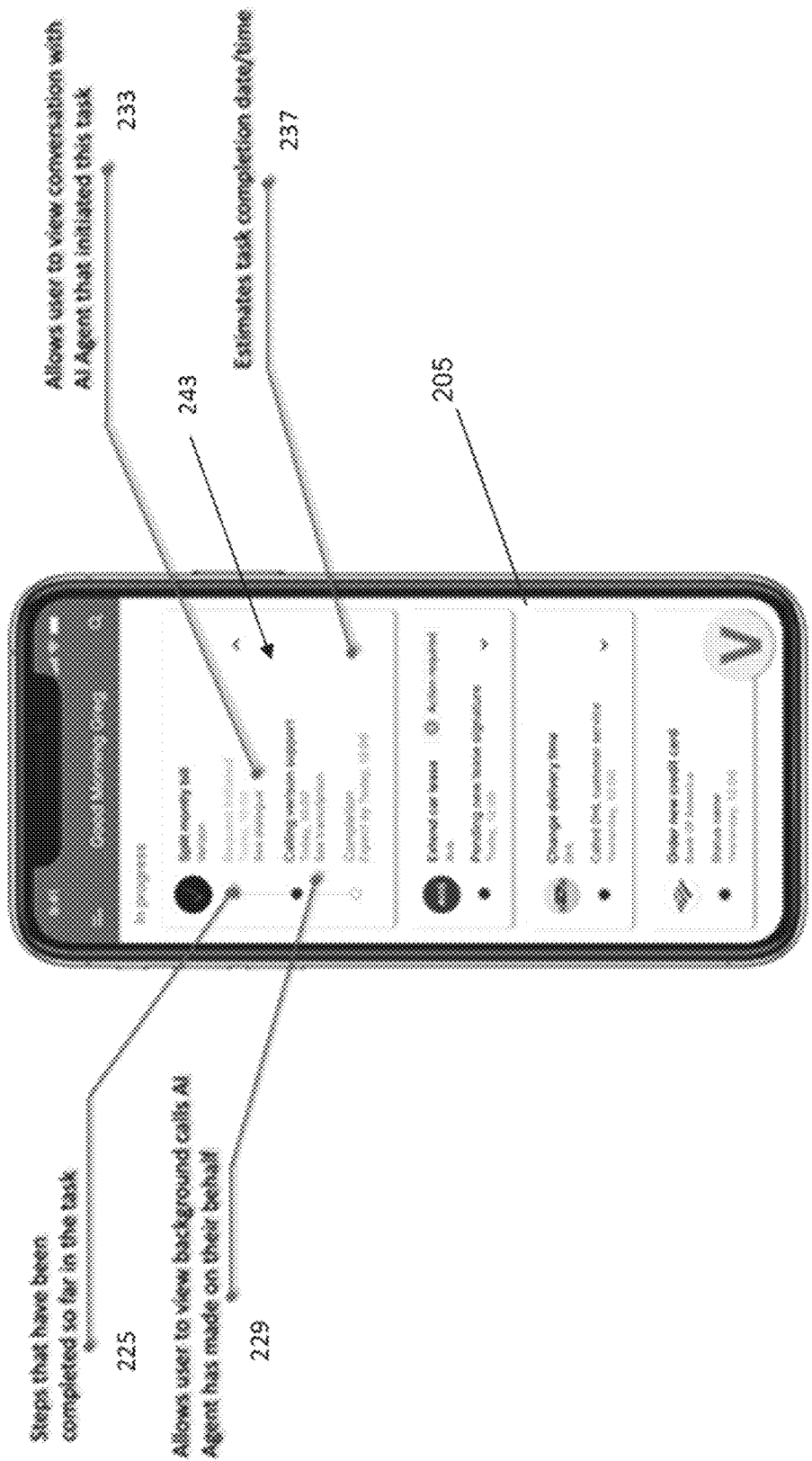
FIG. 2C is a schematic illustration of detailed descriptions available by activating the simulated cards shown in FIG. 2A.

Referring to FIG. 2C, the graphical user interface 205 may allow for expanding any of the task cards 143 to display further information related to the task. In an alternative embodiment, the task card 243 itself may present as an expanded display with more detailed information as a default mode, and the user may "scroll" through to get to task cards not visible on the display screen. For example, if a customer clicks on a specific task card 143 as illustrated in FIG. 2A, the task card 143 expands to show the task timeline, as illustrated in FIG. 2C. In the illustrated example, at the top is the task creation event. The expanded task card 243 with more detailed information may display such information as steps that have been completed thus far in the task 225, background calls the AI has made on behalf of the customer 229, conversations with the AI agent that initiated the task 233, estimates to completion of the task 237, such as date, time, or duration, and any other status information as may be appropriate for a requested task.

Figure 2D:
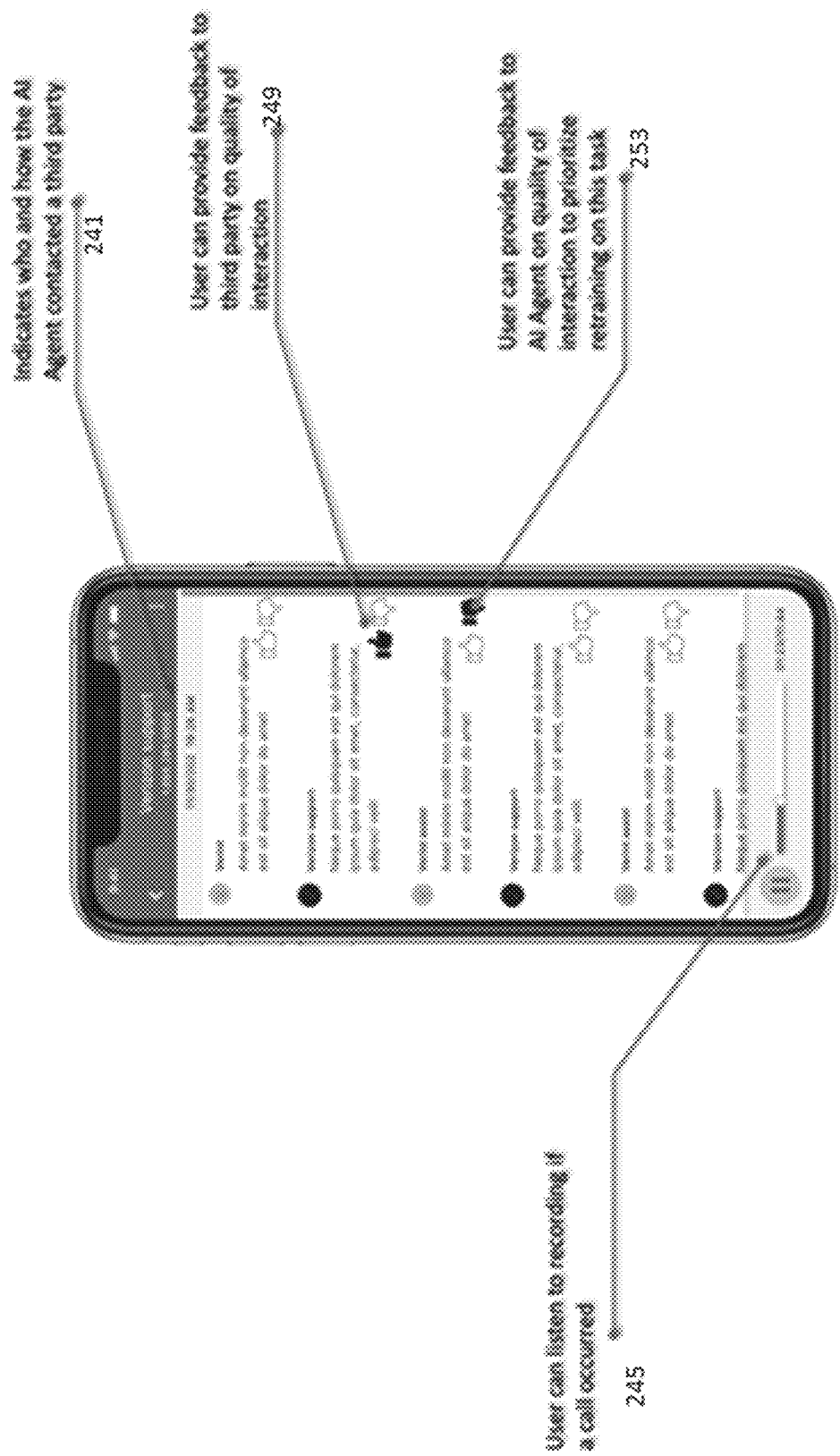
FIG. 2D is a schematic illustration of the options for feedback communications back to the IVA of FIG. 1A from the customer device of FIG. 1B.

As illustrated in FIG. 2D, the customer can view the transcript of the conversation with the customer IVA service component 124 that created the task if, for example, the customer does not recall some details of what the task was for. The GUI 205 may display who and how the IVA 103 contacted a third party 241, provide a means by which the customer could listen to a recording of a call if a call occurred 245, and displays a list of steps the customer IVA service component 124 has taken so far in completing the task. If the IVA 103 has contacted outside parties to complete the task, for example a contact center, the logs or transcripts of any external communications are made available to the user for auditing the performance of the assistant. The GUI may also provide input that allows the customer to provide feedback to the third party (or entity) on the quality of the interaction via the customer IVA 249 and/or to provide feedback 249, 253 to the IVA application 140 on the quality of the interaction and/or prioritization of the task. While illustrated in FIG. 2D as a "thumbs up"/"thumbs down" toggle button, other feedback mechanisms, including other "button" inputs, and/or textual or audio input mechanisms may be provided.

For example, in the transcript log view of FIG. 2D, the user can provide feedback 249, 253 by grading the quality of the interactions between the customer service representative and the virtual agent. Feedback can be in the form of thumbs up/down or a Likert scale. Feedback on customer service representatives can optionally be shared with the third party provided the third party contact center is running complementary systems. Feedback on the quality of the intelligent virtual assistant interactions may be saved to later improve the performance of the backend dialog system. Thus, in the present configuration, customers can have a virtual assistants perform tasks on their behalf.

After the task is commenced by the IVA 103 on behalf of the customer, the next step may be a determination of the task completion outcome (success or failure), a request for information from the user if the assistant is stuck (e.g., a tracking number is needed to complete the task), or an estimated task completion date and time.

According the presently described systems, the disclosed IVA assistant application allows for performing multiple background tasks on behalf of a customer, with the customer having interactions with the overall IVA 103 via a graphical user interface 205, a first communication link 107, and an API gateway 149.

FIGS. 3A-3C illustrates example information that may be included in the user profile that is stored in the application database, according to certain embodiments. In accordance with the present disclosure, there may be two classes of information stored in the user profile that may be used by the outbound IVA service component 120. As shown in FIG. 3A, the first type of information is customer information 300 or identifying information such as name, birthdate, address, phone number, account number, etc. The customer information 300 may be stored in a data structure, for example, a delimited text file, a JSON file, a XML, or a SQL database. FIG. 3A illustrates an example of customer information associated with five customers. According to certain embodiments customer information 300 may be relatively unchanging and considered to be static, although there may be changes from time to time as customer information changes (e.g., address, phone number, name, etc.). The customer information 300 may be obtained by the customer IVA service component 124 through an application settings page, conversationally by the IVA asking for specific information from the customer, or by linking the IVA application to a third-party identity provider such as Google or Microsoft.

In accordance with the present disclosure, the second class of information is dynamic task-specific information, such as package tracking number, repair date, delivery address, product name, purchase date, airline information, etc. FIGS. 3B and 3C illustrate example of dynamic information associated with the customers in FIG. 3A. For example, FIG. 3B illustrates dynamic customer purchase information 310 associated with customer number 1, in particular, information associated with a purchase of goods or services. In another example, FIG. 3C illustrates dynamic customer flight information 320 associated with customer numbers 2 and 3, in particular, airline travel information that these customers would like to reschedule.

Figure 4:
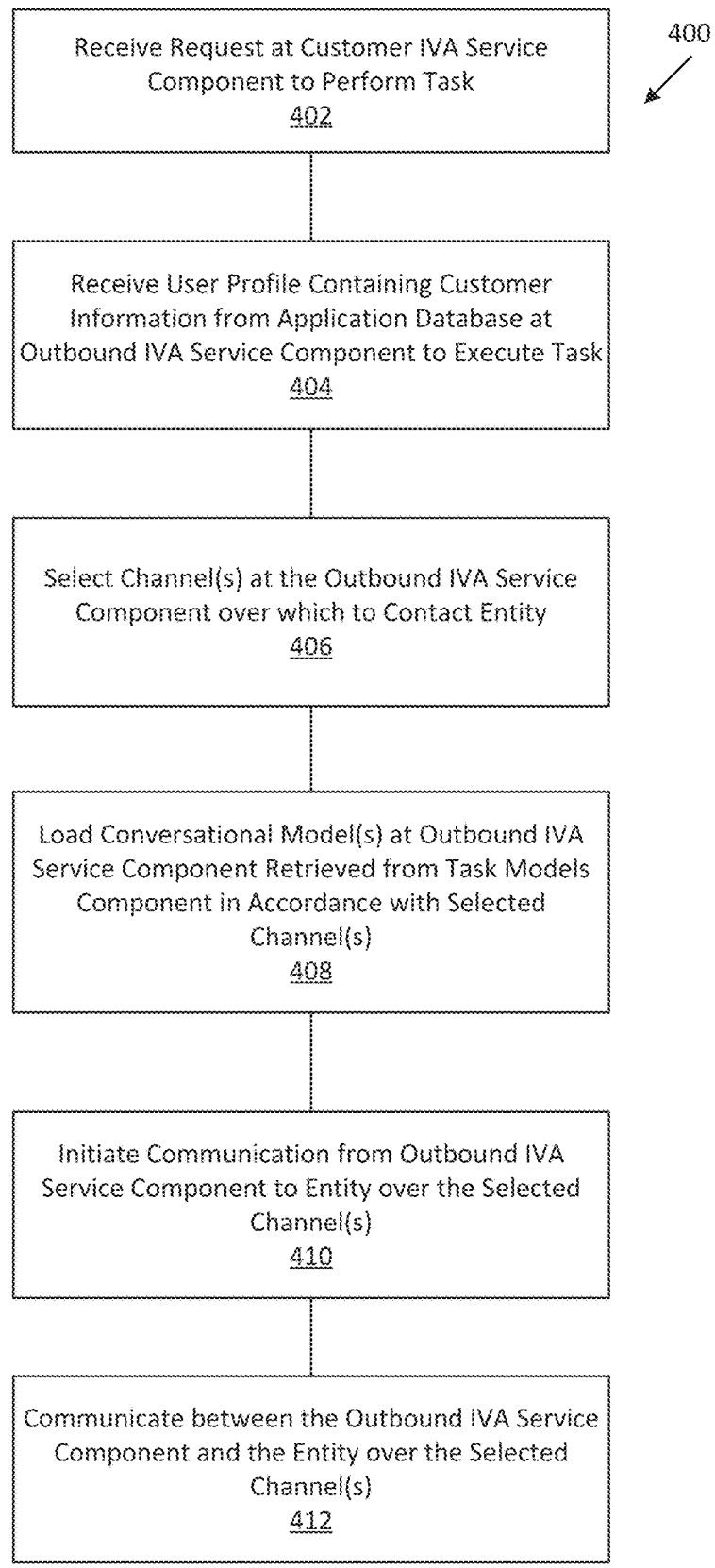
FIG. 4 is an example flow diagram of operations performed to receive a task and select channel(s) and conversational model(s) to contact an entity associated with the task according to certain embodiments.

FIG. 4A illustrates an example flow diagram 400 of operations performed by the virtual assistant service 103 according to certain embodiments. At block 402, a request to perform the task is received at the customer IVA service component 124. A request may be received from the customer device 105, such as, a smartphone, desktop computer, laptop computer, tablet, at the customer IVA service component 124 to perform a task on behalf of the customer. For example, Thomas Smith may request that the outbound IVA service component 120 track a package purchased on Apr. 2, 2022. In another example, Scott Johnson or Michael Williams may wish to change their flights to new departure dates and new departure times by inputting their requests into their customer device 105, which are received by the customer IVA service component 124.

At block 404, the user profile 127 containing customer information 300, 310 and/or 320 to execute the requested task is received by the outbound IVA service component 120 from the application database 126. For example, the outbound IVA service component 120 may query the application database 126 to retrieve the user profile 127 and the relevant customer information 300, 310 and/or 330 to execute the requested task.

In some non-limiting embodiments, at block 406, a channel(s) is selected by the outbound IVA service component over which to contact an entity associated with the request. Once the outbound IVA service component 120 has obtained all of the information necessary to perform the desired task, the selection of which channel(s) to contact the entity may be made based on cost, speed, urgency, etc. the channels may include, but are not limited to SMS message, email, post on social channels, connect to live chat, audio, or an API connection to the entity that is to be contacted to perform the task. The appropriate channel to be used to contact the entity may be selected by an algorithm (such as a channel selection algorithm that is a decision tree with weights, a set of rules, and/or business logic) based on current estimations of task completion, wait times, monetary cost, support contract, etc. Alternatively, the channel to be used may be specified by the customer.

At block 408, the conversational models 131 in accordance with the selected channels are loaded by the outbound IVA service component 120. As noted above, the task model component 118 includes a library of available pre-trained conversational models 131 that can be organized by specific task, company, or industry. The outbound IVA service component 120 loads the appropriate one or more of the conversational models stored by the task model component 118 to complete the request.

At block 410, communication between the outbound IVA service component 120 is initiated over the selected channel (s) using the loaded conversational model(s) 131 and the user profile 127. For example, outbound IVA service component 120 may create a new process to place a telephone call, SMS message, email, post on social channels, connect to live chat or initiate an API connection to the entity as determined in 406. At block 412, communication between the outbound IVA service component 120 and the destination entity 142 is performed over the selected channel(s).

In another embodiment at block 408, the outbound IVA service component 120 may perform automated authentication on behalf of customers. As part of contacting an entity, one or more verification procedures are typically performed to prove the caller's identity. These verification procedures involve the customer service agent asking the caller for data known to both the company and the caller but is not public. Examples may include but are not limited to, account numbers, last payment amount, PIN numbers, or card numbers. When the outbound IVA service component 120 connects to a contact center 102 on behalf of its customer, the outbound IVA service component 120 can have this verification data stored as part of the customer profile. When contact center agents 110 ask for verifying information, the outbound IVA service component 120 can use the profile to answer these questions and authenticate the call or chat conversation without the need to connect with the customer to verify their information.

Figure 5:
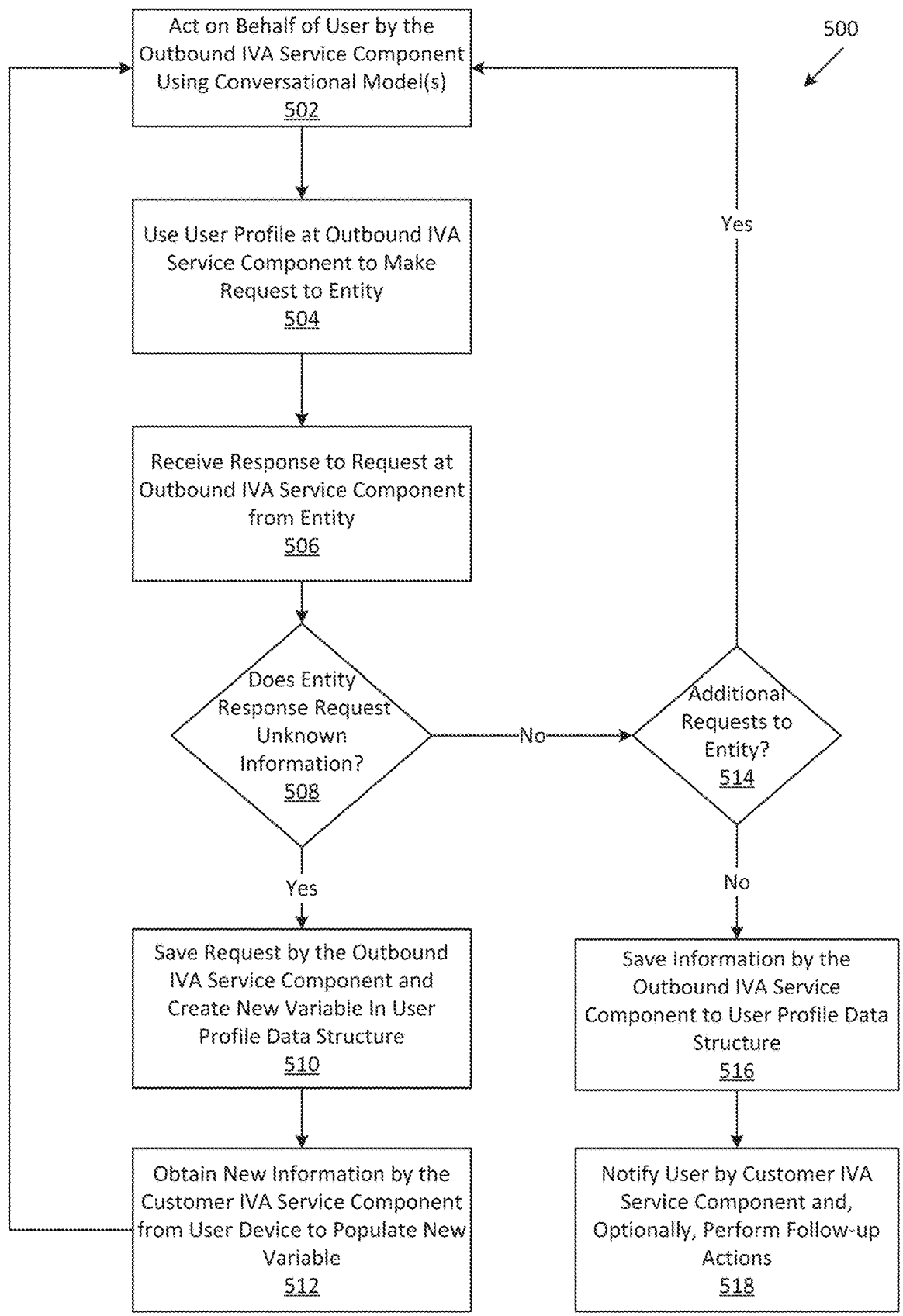
FIG. 5 is an example flow diagram of operations performed to perform the task according to certain embodiments.

FIG. 5 illustrates an example flow diagram 500 of operations performed by the outbound IVA service component 120 according to certain embodiments. At block 502, once communication has been initiated with a destination entity 142 by the outbound IVA service component 120, the selected conversational model from FIG. 4A, block 408 is used to act on behalf of the customer.

At block 504, using the user profile, requests to the entity are made by the outbound IVA service component 120. For example, the request may be made to the entity by the outbound IVA service component 120 through a live agent, and entity IVA, an exposed API, and email, an SMS message, and/or a social post. The outbound IVA service component 120 functions by mapping the delexicalized variable names to the names of the data within the user profile database record. For example, if a customer had populated the profile with the following variables: actor="scott," destination_city="new york city," and departure_date="Apr. 5, 2022" and suppose the contact center agent talking to the IVA were to ask the question "Where are you flying to?" the IVA would generate the response "<actor> would like to fly to <destination_city> on <departure_date>" which would be passed to the user profile injection module that would render the final response as "sally would like to fly to new york city on april fifth twenty two" using variable replacement. Repeating this process for each prompt from the customer service agent will allow the outbound IVA service component 120 to complete a task on behalf of its customer.

At block 506, a response to the request from the destination entity 142 is received by the outbound IVA service component 120. At block 508, it is determined by the outbound IVA service component 120 if the response from the entity requests unknown information. The outbound IVA service component 120 knows what to expect the contact center agent to ask based on an analysis of historical calls/transcripts with people trying to accomplish the same request or task. From this historical data the outbound IVA service component 120 is trained to anticipate similar questions from the contact center agent. This training data is associated to particular intent labels such as "billing address", "account number", or "refund account". Therefore, if a contact center agent 110 asks for something that was not asked for historically in the data used to train the outbound IVA service component 120 for this particular request or task/entity combination, the outbound IVA service component 120 will not be able to use the task model component 118 to map the query into any known intents it has been trained on and it will not be able to provide a response. In those cases, the outbound IVA service component 120 knows that it has been asked for something it has not be trained to provide.

If yes, then at block 510 the request is saved by the outbound IVA service component 120, and a new variable is created in the appropriate customer information database (FIG. 3A, 310 or 330) to store the unknown information. For example, in response to Scott Johnson's request to reschedule a flight departing on Apr. 5, 2022, to Apr. 7, 2022, at 8:00 AM, Delta may want to know if Scott Johnson would like to upgrade his seat on the new flight to first class. As the outbound IVA service component 120 does not know this information, it may create a new variable, for example, the column identified as "upgrade" in the customer dynamic flight information shown in FIG. 3 at reference 320. The new variable may be a new intent classification that is associated with the contact center agent query received by the task model component 118 back from the destination entity 142. It may be used as a training sample and the delexicalized user response as the response template to the intent to rebuild the conversational model 131 so next time the outbound IVA service component 120 is asked that question it can respond and continue the task. At block 512, information is obtained by the customer IVA service component 124 from the customer device 105 to populate the new variable. After gathering the new information from the customer, the process returns to block 502.

If, at block 508, the entity is requesting unknown information, then it is determined by the outbound IVA service component 120 at block 514 if any additional requests need to be sent from the destination entity 142 to the customer device 105 in order to complete the request or task. The outbound IVA service component 120 may determine a need for the additional information based on further questions from the destination entity's contact center agent 110, API responses from the contact center 102, additional chat questions, or SMS messages received by the outbound IVA service component 120 in accordance with the selected channel. If there are no additional requests for data, then the information from the interaction between the outbound IVA service component 120 and the destination entity 142 the entity is saved at block 516, and the customer is notified at block 518 by the customer IVA service component 124. For example, once the requested task is completed, the outbound IVA service component 120 will save any relevant information received from the destination entity 142 in the appropriate one of dynamic customer purchase information of FIG. 3, dynamic customer purchase information 310 or dynamic customer flight information 320 of FIG. 3B, or 3C as data structures. This may include, but is not limited to information, such as a confirmation number, tracking number, expected delivery date, etc. Also at block 518, the outbound IVA service component 120 and/or customer IVA service component 124 may create a task log after it ends the conversation with the contact center 102. The outbound IVA service component 120 will then notify the customer of the task completion through customer IVA service component 124 and provide the customer with any relevant information that was gathered.

Optionally or additionally at block 518, the outbound IVA service component 120 may perform additional follow-up actions as well such as placing an event or reminder on the customer's calendar. Further optionally or additionally at block 518, if for some reason the task was unsuccessful due to business rules or environmental factors such as the customer did not have sufficient funds in their checking account or needed to fill out a form and sign it, the outbound IVA service component 120 will provide the customer with the next procedures they need to take in order to complete the task successfully.

Optionally or additionally, the outbound IVA service component 120 may also contact an entity on behalf of a customer to partially automate a conversation. When asked by its customer to contact an entity on their behalf, the outbound IVA service component 120 will select the optimal channel to contact the entity, place the call, chat, or social contact, and wait for the agent to initiate the conversation. Using the customer profile information, the outbound IVA service component 120 can authenticate the customer and then turn the conversation over to the customer for the remainder of the task. This saves the customer from looking up the company contact information, placing a call, live chat, or social contact, waiting in a queue until an agent has picked up the conversation, and authenticating themselves to the agent. In this way, the outbound IVA service component 120 can partially automate the customer service contact in situations where the customer still wants to handle the conversation themselves, for example, in special circumstances like booking bereavement travel or handling sensitive account changes.

Figure 6:
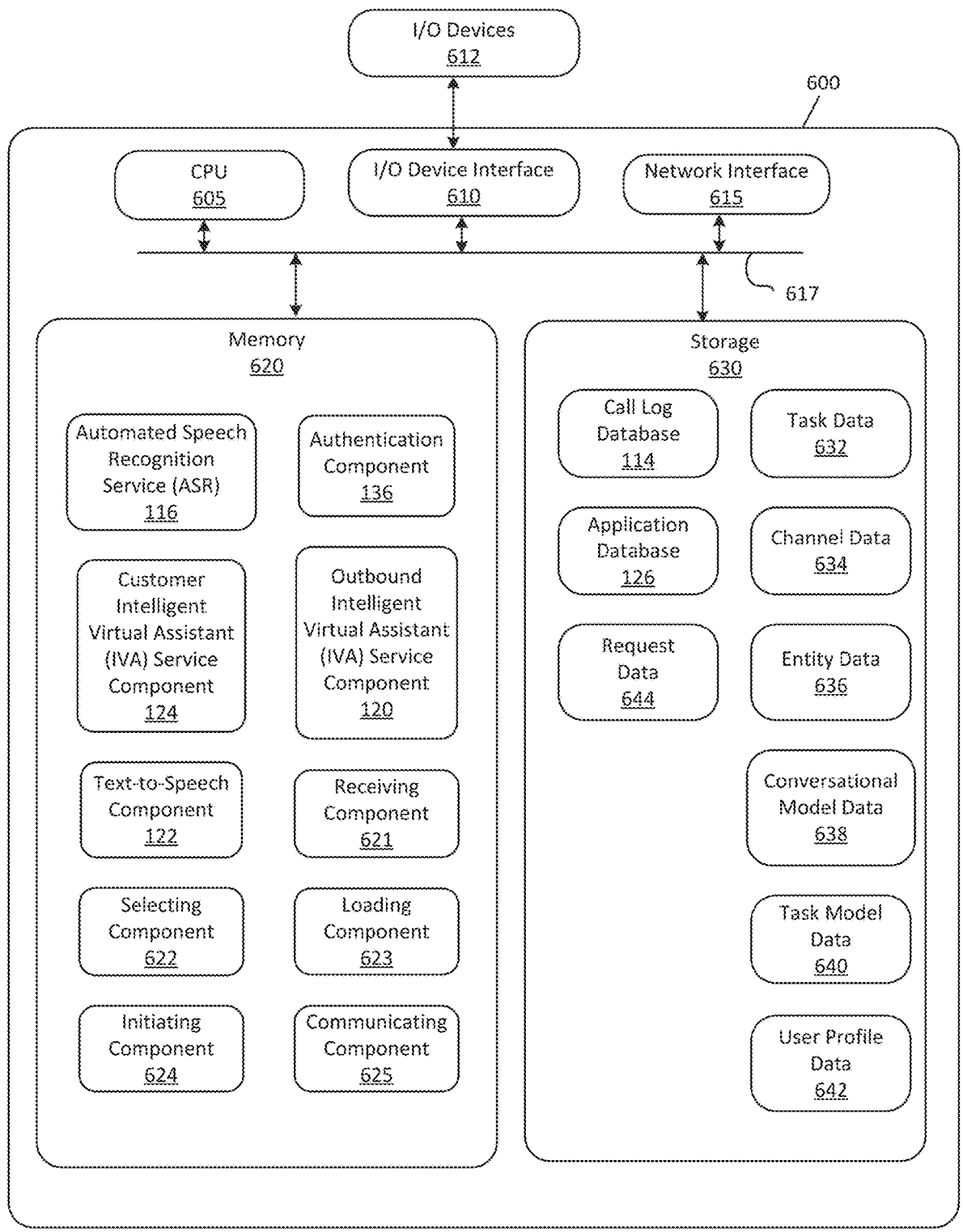
FIG. 6 illustrates example computing systems that may be utilized according to certain embodiments.

FIG. 6 illustrates an example of a computer system 600 that may include the kinds of software programs, data stores, and hardware according to certain embodiments. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display, and mouse devices) to the computing system 600. Further, the computing elements shown in computing system 600 may correspond to a physical computing system (e.g., a system in a data center) or may be a virtual computing instance executing within a computing cloud.

The CPU 605 retrieves and executes programming instructions stored in memory 620 as well as stored in the storage 630. The bus 617 is used to transmit programming instructions and application data between the CPU 605, I/O device interface 610, storage 630, network interface 615, and memory 620. Note, CPU 605 is included to be representative of a single CPU, multiple CPUs, a single CPU having multiple processing cores, and the like, and the memory 620 is generally included to be representative of random-access memory. The storage 630 may be a disk drive or flash storage device. Although shown as a single unit, the storage 630 may be a combination of fixed and/or removable storage devices, such as fixed disc drives, removable memory cards, optical storage, network-attached storage (NAS), or a storage area network (SAN).

Illustratively, the memory 620 includes the API gateway 149, the automated speech recognition service (ASR) 116, the outbound IVA service component 120, the customer IVA service component 124, the text-to-speech component 122, and the authentication component 136, all of which are discussed in greater detail above. The memory 620 further includes a receiving component 621, a selecting component 622, a loading component 623, an initiating component 624 and a communicating component 625 that operate in conjunction with, or integrated within, the API gateway 149, the automated speech recognition service (ASR) 116, the outbound IVA service component 120, the customer IVA service component 124, the text-to-speech component 122, and/or the authentication component 136 to perform the operations described herein. The memory 620 further includes hardware and software implementing an extracting component 670, a classifying component 671, a forming component 673, and a sending component 675.

Further, the storage 630 includes the call log database 114 and the application database 126, all of which are also discussed in greater detail above. The storage 630 also includes task) data 632, channel data 634, request data 644, (collectively task request data 660) entity data 636, conversational model data 638, task model data 640 and user profile data 642. The task data 632 may include, but is not limited to, task-specific information that is obtained by a customer intelligent virtual assistant (IVA) service component 124 in order for the virtual assistance service 103 to act on behalf of the customer. The channel data 634 may include, but is not limited to, information about the channels over which an entity may be contact. The entity data 636, may include, but is not limited to, information about the organization or person being contacted by the outbound IVA service component 120. The conversational model data 638 may include, but is not limited to, the conversational models within the customer conversational AI Model 131. The task model data 640 may include, but is not limited to, information utilized by the task model component 118. The user profile data 642 may include, but is not limited to, information contained within the user profiles 127. The request data 644 may include, but is not limited to, data regarding a task that received from a customer by the API gateway 149 that is passed to the customer IVA service component 124. The storage 630 further includes destination identifier data 661, intent data 662, communications channel data 663, destination entity data 664, and task instructions data 665.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but rather may be implemented in connection with any computing environment. For example, the components described herein can be hardware and/or software components in a single or distributed systems, or in a virtual equivalent, such as, a cloud computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Thus, the system 101 and implementations therein described in the present disclosure allow consumers to utilize a virtual assistant contact customer service departments for them and only be involved in the process when needed, saving them time and effort.

What is claimed:

1. A method of automating data-based tasks on behalf of a user, comprising:
    receiving task instructions comprising (i) a destination identifier that identifies a product or service provider and (ii) a channel identifier that identifies a communications channel associated with the product or service provider;
    retrieving, from a database, one or more variables relevant to a task by querying the database based on an intent of the task instructions, wherein the one or more variables include a user identifier that is specific to the product or service provider;
    loading an artificial intelligence (AI) model selected from one or more pre-trained models based on at least one of (i) the destination identifier, (ii) the channel identifier, and (iii) the intent of the task;
    initiating a bi-directional communication with the product or service provider over the communications channel; and
    generating a response to a query from the product or service provider by using the AI model to replace one or more variables in a response template with the one or more variables relevant to the task.

2. The method of claim 1, wherein the one or more variables relevant to the task include customer information associated with the user or dynamic information associated with the task.

3. The method of claim 1, wherein the communications channel is selected in accordance with a cost, speed, or urgency of the task.

4. The method of claim 3, wherein the communications channel is at least one of SMS messaging, email, posting on social channels, live chat, a live agent, or an API connection.

5. The method of claim 1, wherein the one or more pre-trained models are organized by specific task, entity, or industry.

6. The method of claim 1, further comprising authenticating the user with the product or service provider.

7. The method of claim 1, further comprising:
    determining whether the response from the product or service provider requests unknown information, and if so, creating a new variable and obtaining new information to populate the new variable;
    determining whether there are additional requests to complete the task, and if so, making the additional requests to the product or service provider; and
    if there are no additional requests, notifying the user.

8. The method of claim 1, further comprising:
    mapping a variable of the one or more variables relevant to the task to the one or more variables in the response template, wherein the one or more variables in the response template are delexicalized variable names corresponding to data within a user profile of the user.

9. A computer system, comprising:
    a memory comprising computer-executable instructions; and
    a processor configured to execute the computer-executable instructions and cause the computer system to:
        receive task instructions comprising (i) a destination identifier that identifies a product or service provider and (ii) a channel identifier that identifies a communications channel associated with the product or service provider;
        retrieve, from a database, one or more variables relevant to a task by querying the database based on an intent of the task instructions, wherein the one or more variables include a user identifier that is specific to the product or service provider;
        load an artificial intelligence (AI) model selected from one or more pre-trained models based on at least one of (i) the destination identifier, (ii) the channel identifier, and (iii) the intent of the task;
        initiate a bi-directional communication with the product or service provider over the communications channel; and
        generate a response to a query from the product or service provider by using the AI model to replace one or more variables in a response template with the one or more variables relevant to the task.

10. The computer system of claim 9, wherein the one or more variables relevant to the task include customer information associated with a user or dynamic information associated with the task.

11. The computer system of claim 9, wherein the communications channel is selected in accordance with a cost, speed, or urgency of the task.

12. The computer system of claim 11, wherein the communications channel is at least one of SMS messaging, email, posting on social channels, live chat, a live agent, or an API connection.

13. The computer system of claim 9, wherein the one or more pre- trained models
are organized by specific task, entity, or industry.

14. The computer system of claim 9, wherein the instructions further cause the computer system to authenticate a user with the product or service provider.

15. The computer system of claim 9, wherein the instructions further cause the computer system to:
determine whether the response from the product or service provider requests unknown information, and if so, creating a new variable and obtaining new information populate the new variable;
determine whether there are additional requests to complete the task, and if so, making the additional requests to the product or service provider; and
if there are no additional requests notifying a user.

16. The computer system of claim 9, wherein the instructions further cause the computer system to:
map a variable of the one or more variables relevant to the task to the one or more variables in the response template, wherein the one or more variables in the response template are delexicalized variable names corresponding to data within a user profile.

17. A non-transitory computer readable medium comprising instructions that, when executed by a processor of a processing system, cause the processing system to:
receive task instructions comprising (i) a destination identifier that identifies a product or service provider and (ii) a channel identifier that identifies a communications channel associated with the product or service provider;
retrieve, from a database, one or more variables relevant to a task by querying the database based on an intent of the task instructions, wherein the one or more variables include a user identifier that is specific to the product or service provider;
load an artificial intelligence (AI) model selected from one or more pre-trained models based on at least one of (i) the destination identifier, (ii) the channel identifier, and (iii) the intent of the task;
initiate a bi-directional communication with the product or service provider over the communications channel; and
generate a response to a query from the product or service provider by using the AI model to replace one or more variables in a response template with the one or more variables relevant to the task.

18. The non-transitory computer readable medium of claim 17, wherein the one or more pre-trained models
are organized by specific task, entity, or industry.

19. The non-transitory computer readable medium of claim 17, wherein the instructions further cause the processing system to:
determine whether the response from the product or service provider requests unknown information, and if so, creating a new variable and obtaining new information populate the new variable;
determine whether there are additional requests to complete the task, and if so, making the additional requests to the product or service provider; and
if there are no additional requests, notifying a user.

20. The non-transitory computer readable medium of claim 17, wherein the instructions further cause the processing system to:
map a variable of the one or more variables relevant to the task to the one or more variables in the response template, wherein the one or more variables in the response template are delexicalized variable names corresponding to data within a user profile.

\* \* \* \* \*